(12) United States Patent
Van Aerle et al.

(10) Patent No.: US 10,572,074 B2
(45) Date of Patent: Feb. 25, 2020

(54) ELECTRONIC DEVICE WITH A FLEXIBLE PANEL AND METHOD FOR MANUFACTURING A FLEXIBLE PANEL

(71) Applicant: Samsung Electronics Co., Ltd., Suwon-si, Gyeonggi-do (KR)

(72) Inventors: Nicolaas Aldegonda Jan Maria Van Aerle, Eindhoven (NL); Michel Josephus Marie Somers, Eindhoven (NL); Petrus Johannes Gerardus Van Lieshout, Eindhoven (NL); Johannes Cornelis Adriaan Hamers, Eindhoven (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/942,821

(22) Filed: Nov. 16, 2015

(65) Prior Publication Data

US 2016/0077633 A1  Mar. 17, 2016

Related U.S. Application Data

(63) Continuation of application No. 12/747,854, filed as application No. PCT/NL2008/050797 on Dec. 12, 2008, now Pat. No. 9,215,301.

(60) Provisional application No. 61/013,592, filed on Dec. 13, 2007.

(51) Int. Cl.
| | |
|---|---|
| *G06F 3/044* | (2006.01) |
| *G06F 1/16* | (2006.01) |
| *G06F 3/041* | (2006.01) |
| *H04M 1/02* | (2006.01) |

(52) U.S. Cl.
CPC ............ *G06F 3/044* (2013.01); *G06F 1/1601* (2013.01); *G06F 1/165* (2013.01); *G06F 1/1613* (2013.01); *G06F 1/1615* (2013.01); *G06F 1/1652* (2013.01); *G06F 1/1683* (2013.01); *G06F 3/0412* (2013.01); *G06F 3/0416* (2013.01); *H04M 1/0268* (2013.01); *G06F 2203/04102* (2013.01); *H04M 2250/22* (2013.01)

(58) Field of Classification Search
CPC .......... G06F 3/044; G06F 1/1615; G09F 9/35; G02F 1/13338
USPC ............................................ 345/173; 40/515
See application file for complete search history.

(56) References Cited

U.S. PATENT DOCUMENTS

| | | | | |
|---|---|---|---|---|
| 5,528,267 | A * | 6/1996 | Ise | G06F 3/044 178/18.06 |
| 6,949,393 | B2 * | 9/2005 | Van Aerle | G02F 1/133351 349/153 |
| 8,373,664 | B2 * | 2/2013 | Wright | G06F 3/044 178/18.01 |
| 2005/0083307 | A1 * | 4/2005 | Aufderheide | G06F 3/044 345/173 |

(Continued)

*Primary Examiner* — Christopher E Leiby
(74) *Attorney, Agent, or Firm* — Jefferson IP Law, LLP

(57) ABSTRACT

The electronic device comprises a data processing facility, a flexible panel, and a facility for arranging the panel at least into an extended shape and into a compact shape. The flexible panel includes a display structure responsive to output signals from the data processing facility, a touch sensitive structure arranged for providing input signals to the data processing facility indicative for a change of capacitance at a position where a pointing device approaches the panel.

23 Claims, 11 Drawing Sheets

(56) References Cited

U.S. PATENT DOCUMENTS

| | | | |
|---|---|---|---|
| 2006/0102460 A1* | 5/2006 | Bourdelais | G06F 3/045 200/512 |
| 2006/0107566 A1* | 5/2006 | Van Rens | G09F 9/35 40/515 |
| 2007/0085837 A1* | 4/2007 | Ricks | G02F 1/13338 345/173 |
| 2007/0211036 A1* | 9/2007 | Perkins | G06F 1/1615 345/173 |
| 2009/0267870 A1* | 10/2009 | Schellingerhout | G09F 9/301 345/55 |
| 2010/0066702 A1* | 3/2010 | Lee | G06F 3/044 345/174 |
| 2011/0267300 A1* | 11/2011 | Serban | G06F 3/03547 345/174 |

* cited by examiner

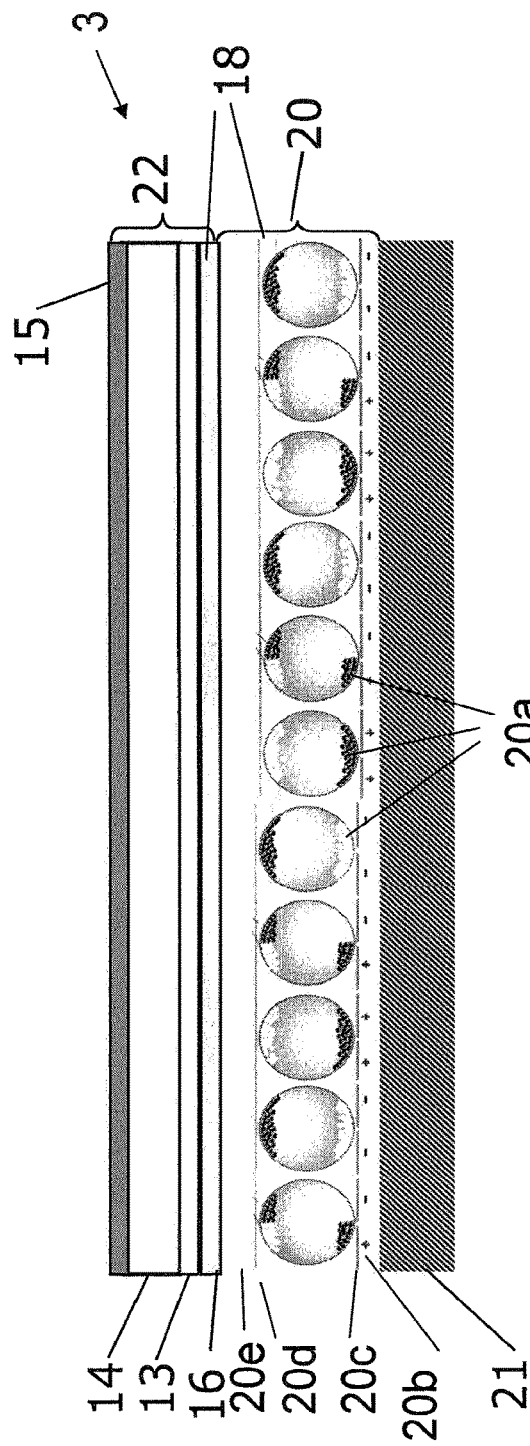
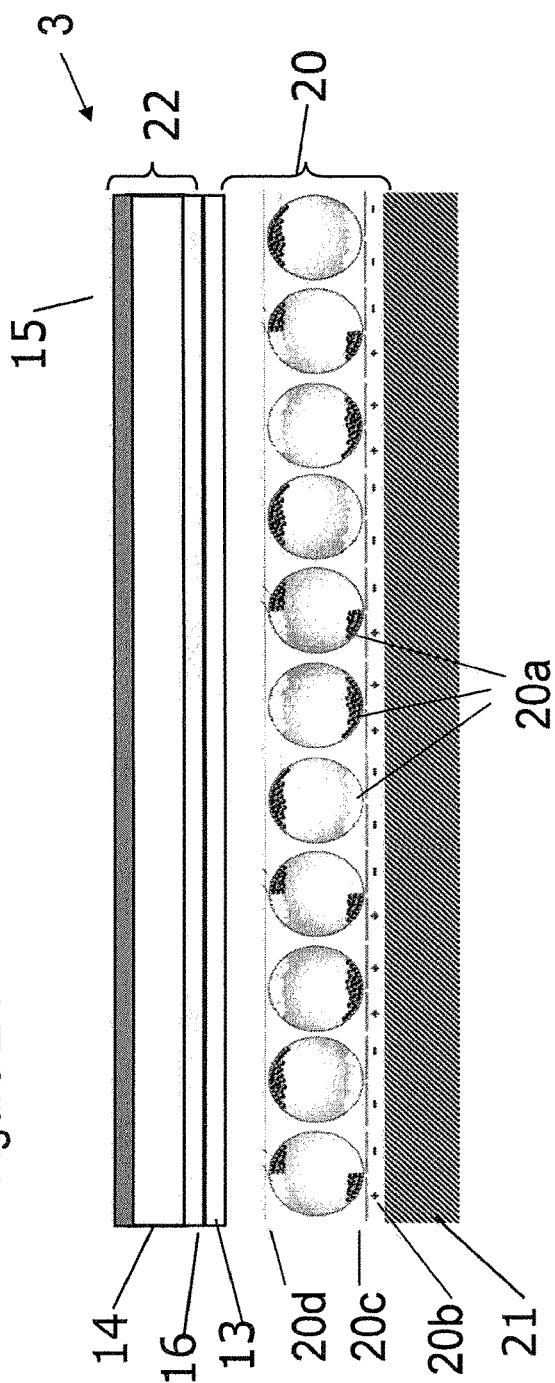
Figure 2A
Figure 2B

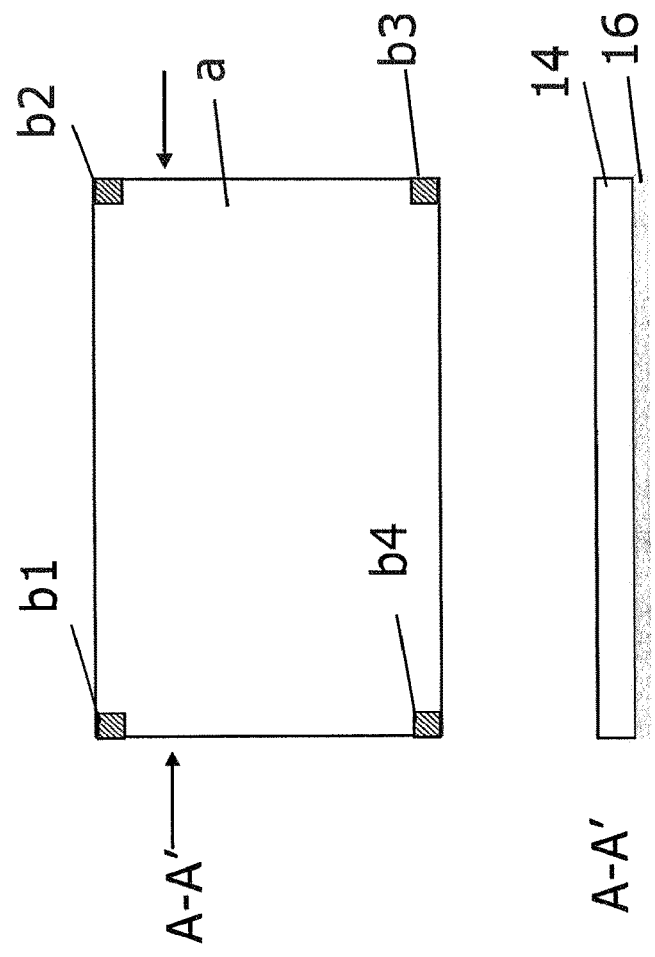
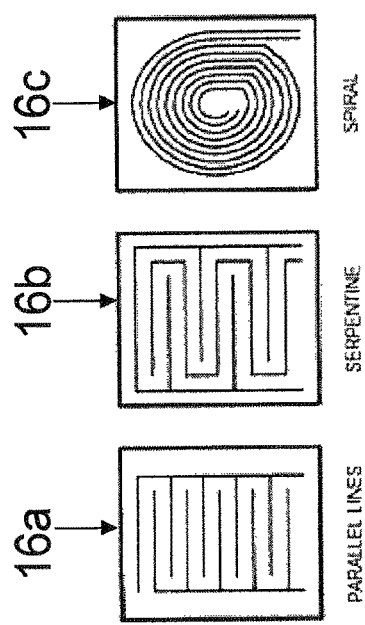
Figure 3A
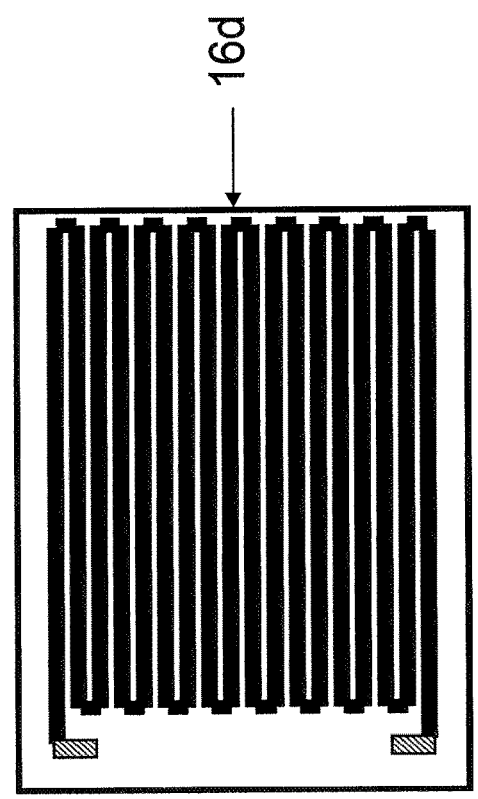
Figure 3B
Figure 3C

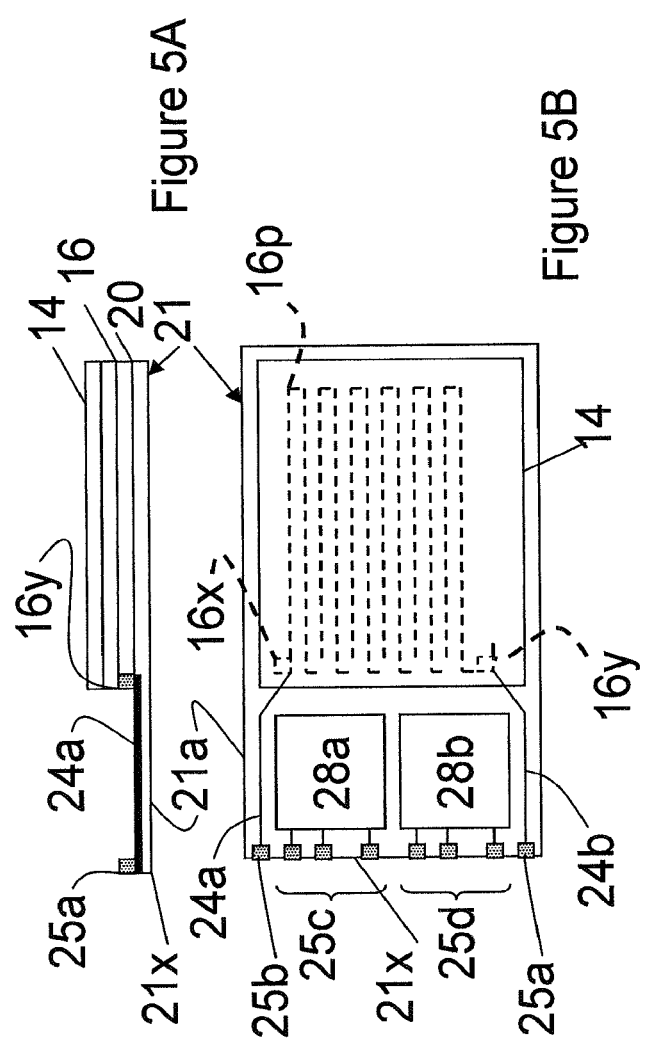

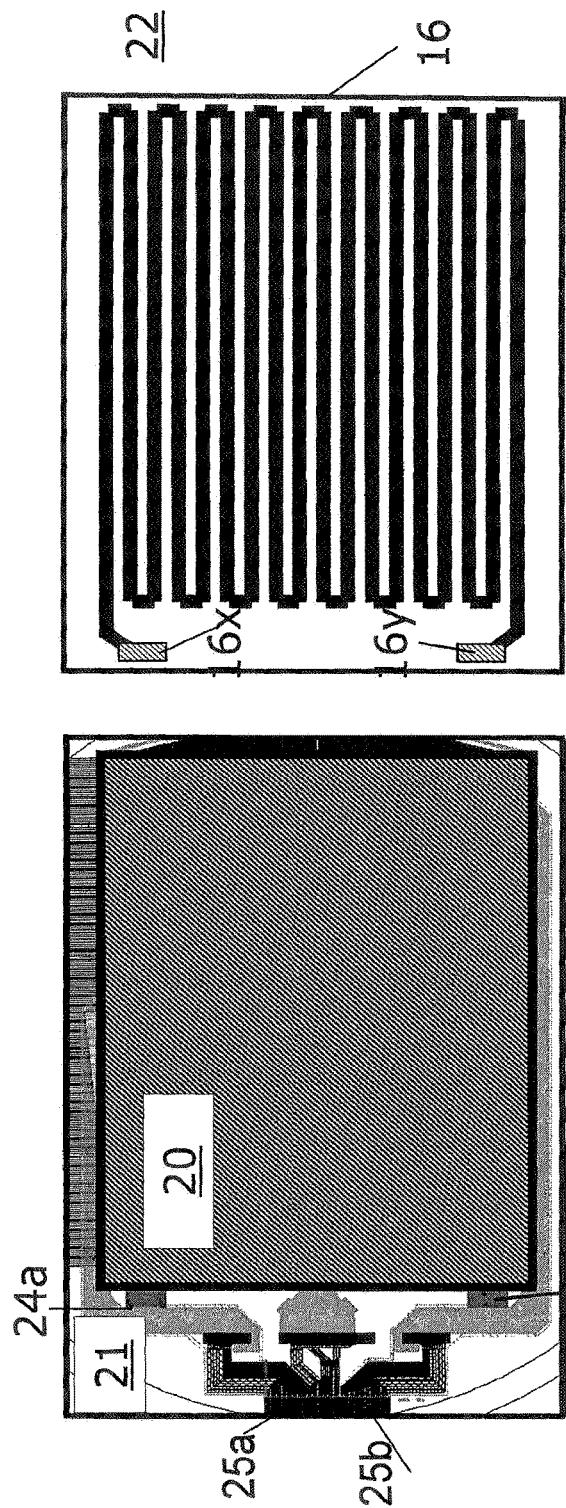
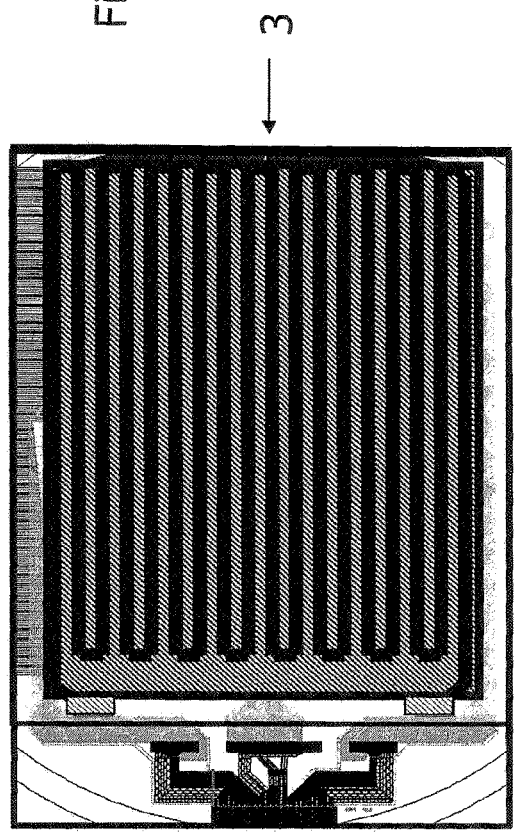
Figure 5C
Figure 5D
Figure 5E

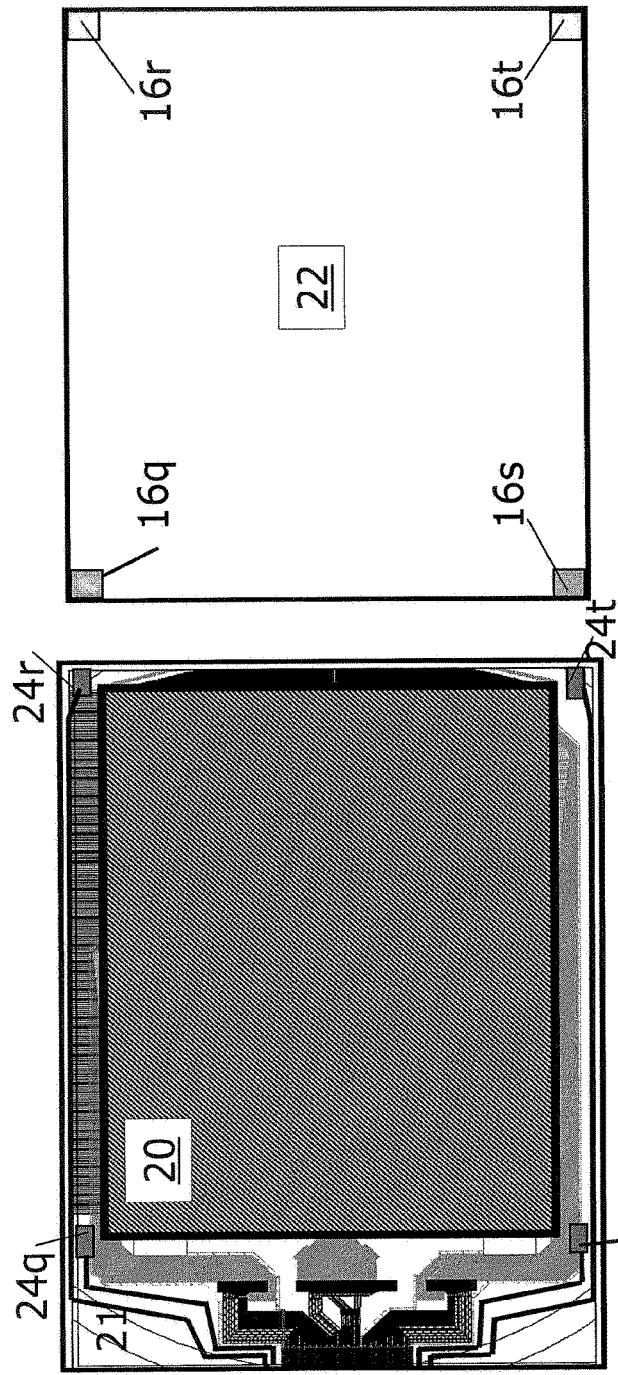
Figure 7A
Figure 7B
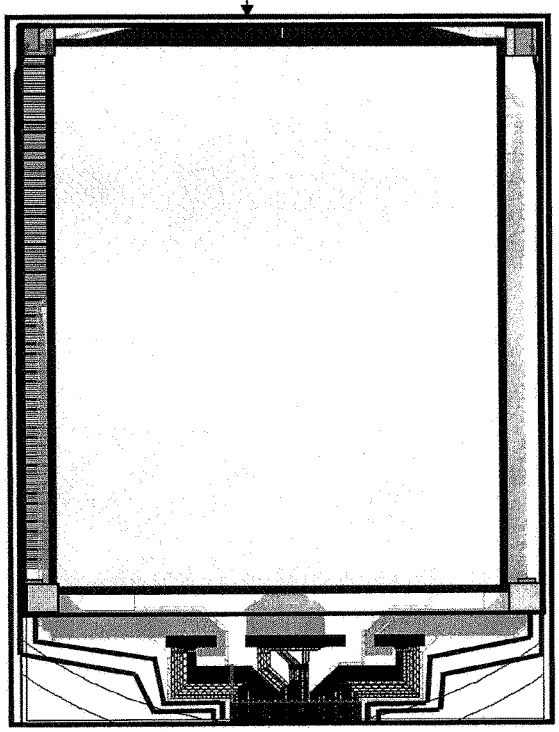
Figure 7C

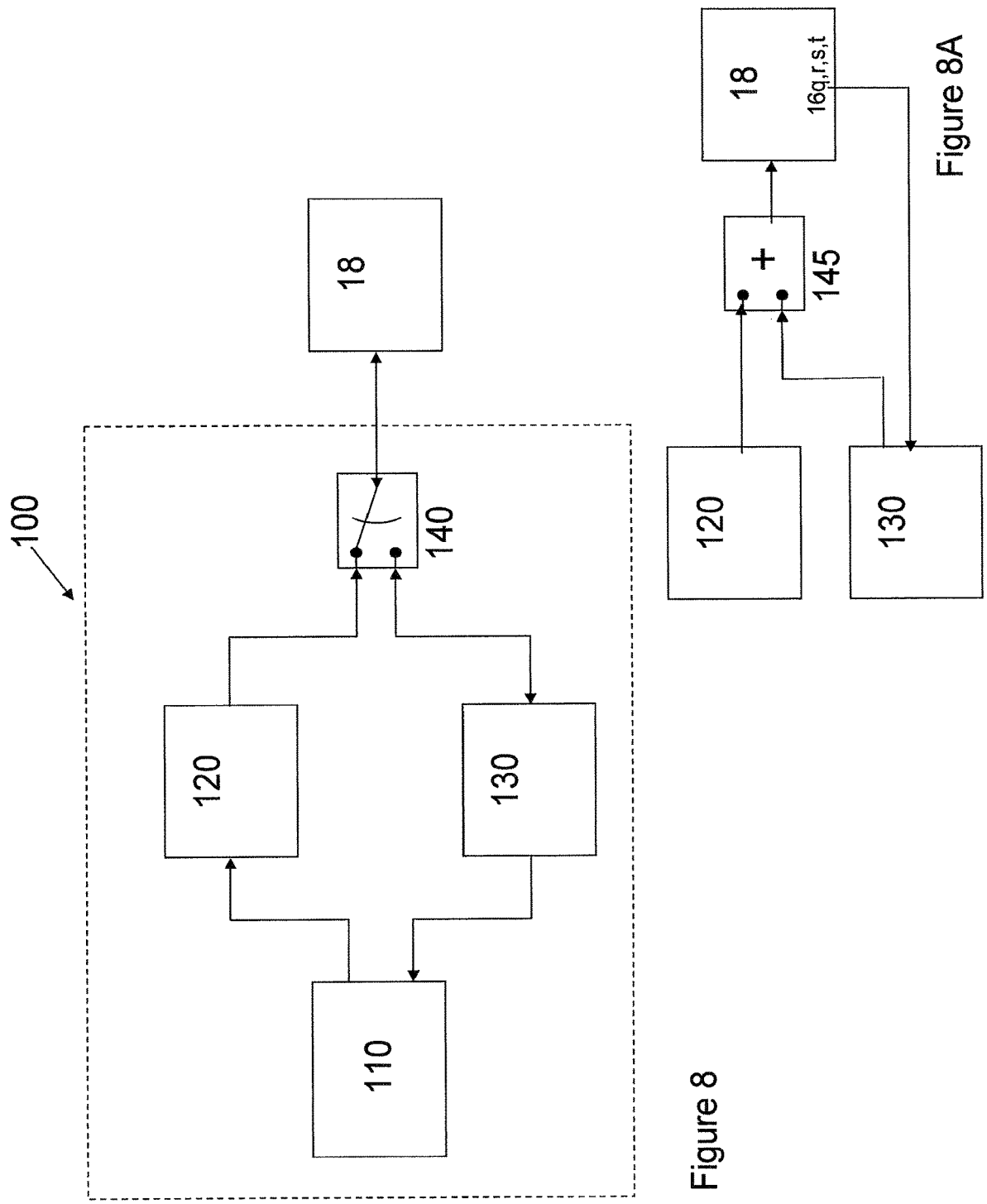

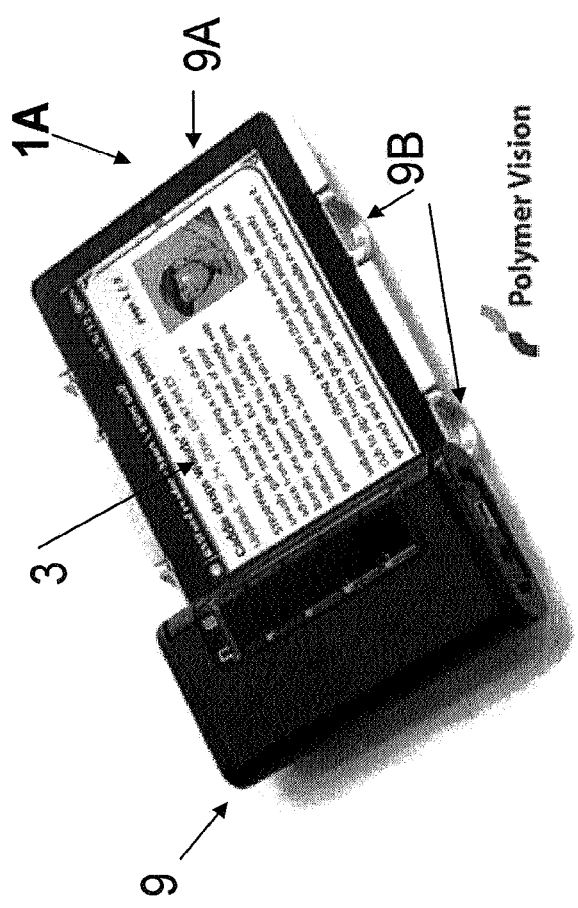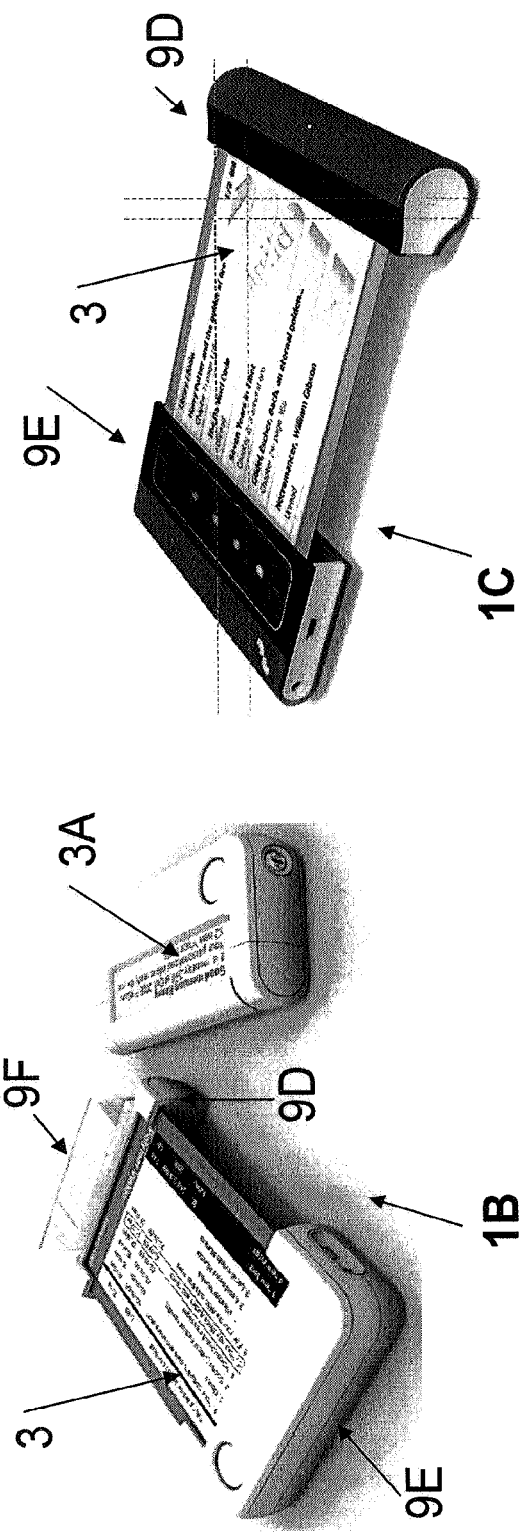
Figure 9

ELECTRONIC DEVICE WITH A FLEXIBLE PANEL AND METHOD FOR MANUFACTURING A FLEXIBLE PANEL

CROSS REFERENCE TO RELATED APPLICATIONS

This Application is a continuation of U.S. application Ser. No. 12/747,854, filed on Oct. 26, 2010, the entirety of which is incorporated by reference herein, which is a 371 of PCT/NL08/50797, filed on Dec. 12, 2008, which claims the benefit of U.S. Provisional Application 61/013,592, filed on Dec. 13, 2007.

FIELD OF THE INVENTION

The invention relates to an electronic device with a flexible display panel. The invention further relates to a method for manufacturing a flexible display panel.

BACKGROUND OF THE INVENTION

An electronic apparatus comprising a collapsible display conceived to be alternated between a collapsed state upon storage and an extended state during use is known in the art. For instance, such apparatus may relate to a mobile phone or an organizer, wherein the display is arranged as a flexible and collapsible body providing a compact structure in a stand-by state and a device with an increased display area during use. The collapsible display may be stored in a housing of the electronic apparatus, for example it may be rolled about a suitable roller. Alternatively, the collapsible display may be wrapped about a housing of the electronic apparatus.

The thinner the display, the more compact it can be arranged. In practice it has been found that the minimum radius to which the display can be rolled is approximately 50 times the thickness of the display. If it is attempted to roll the display to a smaller radius, the various functional layers of the display tend to shift with respect to each other, and even may break due to stress. This renders the display unusable. In particular this applies for displays in which various functional layers require good alignment with respect to each other, like for example alignment between a pixel electrode layer and a color filter layer.

It is desirable that a touch screen is integrated with the display. This allows the user to intuitively interact with the device.

FIG. 10 (prior art) shows a panel comprising an integrated OLED display and touch screen as proposed in US2004/0080267 (U.S. Pat. No. 6,879,319B2). Both the OLED display 114, 112, 116, and 122 and the touch screen 52, 54, 58, and 60 have light blocking elements resp. 23, 56 extending to an edge. The OLED display has an encapsulating cover 36 mounted by an adhesive 70 located between the light blocking elements 23, 56 of the OLED display and the touch screen. The OLED display is arranged at a substrate 80 of glass or plastic.

The OLED display device includes a substrate 80, drivers 23 located at the periphery of the substrate, thin-film transistors (TFTs) 122, an electrode 114, an organic light-emitting layer 112, a second electrode 16, and an encapsulating cover 36. A resistive-wire touch screen is constructed upon the encapsulating cover 36 and includes the resistive layer 52, spacer dots 54, flexible top layer 60, and the electrically conductive layer 58.

SUMMARY

It is a disadvantage of the known panel that the two transparent electrodes 52, 58 absorb some light, which reduces the brightness of the display. Furthermore, due to additional internal reflections the optical quality is reduced.

The known integrated display is not suitable for use in an electronic device wherein it is required that the panel can be stored in a compact form. Even if flexible materials were selected for the various layers in the device, the device still would have a thickness that prohibits compact storage.

In addition the substrate with the display layer should be rigid enough to support the touch sensitive layer to allow it to be compressed locally to indicate a position.

In particular the encapsulating layer 36 should be rigid enough to guarantee that the display structure is not damaged by the pressure exerted at the touch screen.

This prevents the display layer from being flexible enough to arrange it into a compact shape when not in use.

Apart from OLED other display effects are envisioned. Various liquid crystal display effects like for example TN (twisted nematic), STN (super twisted nematic), and non-twisted nematic are well known. Similar to OLED, these liquid crystal display effects are not multi-stable and need to be powered continuously during displaying information.

For mobile display applications the use of low power display solutions is highly preferred. This can be obtained by the application of display effects that are multi-stable, i.e., a picture is loaded on a display and stays on this display even when the power is switched off. This is possible using certain multi-stable display effects, like electrophoretics as for example provided by E Ink Corporation or SiPix Imaging, Inc., or liquid-behavior-powder as described by Bridgestone Corporation. Other bi-/multi-stable display effects include CTLC (Cholesteric Texture Liquid Crystal) and BiNem® (Bistable Nematic).

In addition, the power consumption can be kept to a minimum by application of a reflective effect, in which the ambient light is used as light source, rather than using a power consuming backlight in combination with a power consuming non-multi-stable transmissive display effect like commonly used in Liquid Crystal Displays or emissive OLED. The reflective electro-optical effect is also beneficial considering its readability in sun-light environment, in which emissive display types are very hard to read.

When considering the application of a touch panel function in which activation is obtained by mechanical force, for example using a resistive type of touch panel function, the display effect must be insensitive to the local mechanical force exerted.

All the above mentioned multi-stable display effects can be damaged when a local pressure is applied. To avoid damage one conceivably provide a rigid mechanical barrier, such as a glass substrate, between the display effect layer and the mechanical touch function. This adds weight and thickness to the product which is not preferred in portable applications. In addition the application of a rigid mechanical barrier like a glass substrate is not practical in the use of a highly flexible display device in which the display including the touch sensor should be as thin as possible. Furthermore, when considering a rollable display design in which the display is rolled out of the device, the display can be suspended in a way in which it is only clamped at two display edges. Applying a local mechanical force to activate the touch function is not possible in such a suspended design.

Embodiments of the present invention enable a more compact storage of the display panel in the electronic device.

According to an aspect an electronic device comprises a data processing facility, a flexible panel, and a facility for arranging the panel at least into an extended shape and into a compact shape.

The flexible panel includes
a display structure responsive to output signals ($S_{out}$) from the data processing facility.
a touch sensitive structure arranged for providing input signals ($S_{in}$) to the data processing facility indicative for a change of capacitance at a position where a pointing device approaches the panel.

As the touch sensitive structure in the electronic device is indicative for a change of capacitance at a position where a pointing device approaches the panel it is not necessary that the touch sensitive structure is compressible or activated by mechanical force. Accordingly the touch sensitive structure can be relatively thin. Additionally, as the display structure does not need to provide support to allow compression of the touch sensitive structure, it can be relatively thin and flexible. Hence the combination of the display structure and the capacitive touch sensitive structure in the panel can be sufficiently thin to allow for a compact arrangement of the panel.

BRIEF DESCRIPTION OF THE DRAWINGS

These and other aspects are described in more detail with reference to the drawings wherein:

FIG. 9 shows various examples of electronic devices according to illustrative embodiments of the invention.

DETAILED DESCRIPTION OF THE DRAWINGS

In the following detailed description numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes and sizes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that when an element or layer is referred to as being "coupled to" another element or layer, it can be directly on, connected or coupled to the other element or layer or intervening elements or layers may be present. In contrast, when an element is referred to as being "connected to" another element or layer, there are no intervening elements or layers present. Like numbers refer to like elements throughout. As used herein, the term "and/or" includes any and all combinations of one or more of the associated listed items.

Figure 1A:
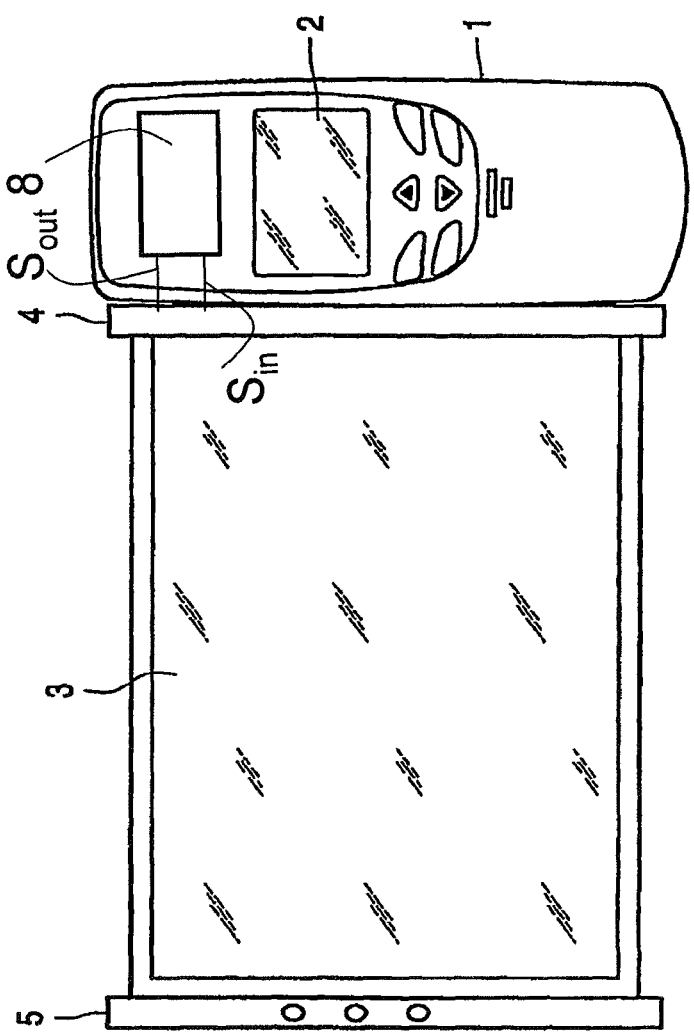
FIG. 1A schematically shows an electronic device according to the invention with the flexible panel in an extended shape, FIG. 1B schematically shows the electronic device of FIG. 1A in which the panel is stored into a compact shape, FIGS. 2A and 2B respectively show schematically a display panel in a first and a second illustrative embodiment of the electronic device of the invention, FIGS. 3A, 3B, and 3C schematically show touch sensitive structures in various illustrative embodiments of the electronic device according to the invention, FIGS. 4A and 4B respectively show schematically a display panel in further illustrative embodiments of the electronic device of the invention, FIGS. 5A and 5B respectively show a cross-section and front view of electrical connections in a display panel in an illustrative embodiment of the electronic device of the invention, FIGS. 5C to 5E respectively show a display structure on a substrate, a touch sensitive structure and a display panel according to said illustrative embodiment.
Figure 1B:
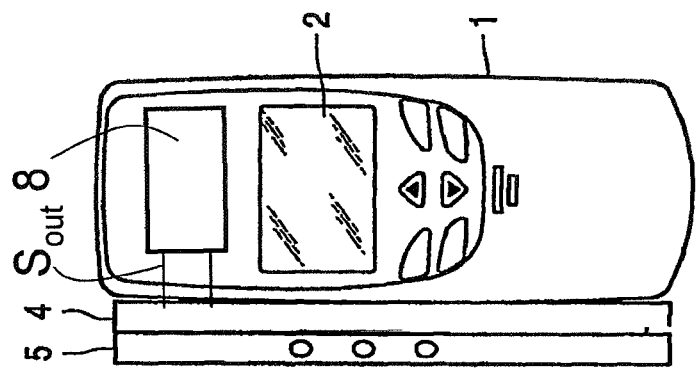

FIGS. 1A and 1B schematically show an electronic device 1, such as a mobile phone or a PDA, comprising a data processing facility 8, and a flexible panel 3. The electronic device further comprises a facility 4, 5 for arranging the panel 3 at least into an extended shape (FIG. 1A) and into a compact shape (FIG. 1B). In the embodiment shown the facility 4, 5 comprises a housing 4 for compactly storing the panel in a rolled up state. In addition the facility has a second housing 5 attached to an end of the panel and comprising control electronics, e.g. user controlled switches. The housing 4 may for example comprise a spindle around which the panel 3 can be wound. FIG. 1B shows the state of the panel 3, where it is compactly stored in the housing 4. As shown in FIG. 1B, the housing 4 with the display panel 3 may be detached from the electronic device. In another embodiment the housing 4 for the display panel is fixed to the electronic device, or even integrated in the electronic device.

Alternatively, the panel 3 is wrapped around the electronic device 1.

In the embodiment shown in FIG. 1B the panel is stored in housing 4 as a roll with a radius of at most 20 mm, preferably at most 10 mm, more preferably 7.5 mm or less. Alternatively the panel is wrapped around the device, and has flat portions as well as a curved portion with a radius of at most 20 mm, preferably at most 10 mm, more preferably 7.5 mm or less. A subdisplay 2 is provided to enable the user to view some basic information without the need to open the main display panel 3.

An embodiment of the flexible panel 3 is shown in FIG. 2A. As shown therein the panel includes a display structure 20 and a touch sensitive structure 22 that are arranged upon a flexible substrate 21, e.g. a PET (Poly Ethylene Terephthalate) or PEN (Poly Ethylene Naphthalate) layer having a thickness of less than 50 µm, preferably less than 25 µm and more preferably less than 15 µm, e.g. 12.5 µm.

The display structure 20 is responsive to output signals $S_{out}$ from the data processing facility. In the embodiment shown, the display structure 20 is reflection based. This is advantageous in that the display is well visible in sunlight. In particular the display structure 20 comprises a layer of multi-stable elements, here electrophoretic elements 20a. The electrophoretic elements 20a are controlled by individual electrodes 20c and a fixed electrode 20d. The individual electrodes 20c are driven by thin film transistors in a TFT layer 20b. An electrophoretic display has the advantage that power is only required to change the image content, and not to maintain the image. Electrophoretic materials are for example provided by E Ink Corporation or SiPix Imaging, Inc. These materials are relatively insensitive for UV-radiation, which allows for a broader range of manufacturing methods when integrating the display with other functional layers. Another technology using bistable elements is based on liquid-behavior-powder as provided by Bridgestone Corporation, as described in a "Development of Novel Bistable Display using Titania Composite" by Hiroaki Wada et al. downloaded from http://www.scientific.net.

Nevertheless, the display layer may be based on another display technology, e.g. CTLC (Cholesteric Texture Liquid Crystal) or BiNem™ (Bistable Nematic) or an emissive technology. For example the display layer may comprise other active display elements like OLEDs. This has the advantage that the display is also visible in dark environments.

The flexible panel 3 further comprises a touch sensitive structure 22, comprising at least a first layer 16 with a electrically conductive structure. The layer 16 is arranged for providing input signals $S_{in}$ to the data processing facility 8 indicative for a change of capacitance at a position where a pointing device approaches the panel.

Capacitive sensing is known as such from e.g. GB 1 464 095. Later examples of capacitive sensing are described in U.S. Pat. No. 6,452,514. Preferably the touch sensitive structure comprises an electrically isolating layer 14, to prevent a resistive contact between the pointing device, e.g. a finger or a stylus, and the first layer 16. Nevertheless the touch sensitive structure is also functional when the user merely maintains an air layer between the pointing device and the first layer 16.

In an embodiment of the electronic device the touch sensitive structure 22 comprises at least a first and a second mutually capacitively coupled electrical conductor that are arranged in the first layer 16 and further comprises a second electrically isolating layer 14. As shown in FIG. 2A the first layer 16 is faced towards the display structure 20. As the mutually capacitively coupled electrical conductors are arranged in the same layer 16 the thickness can be relatively small, which is advantageous for the total thickness of the panel. In a preferred embodiment the first and the second electrical conductor are mutually interlaced as is shown in FIG. 3A. E.g. the layer 16a applies an embodiment wherein the first and the second electrical conductor form comb like structures that engage one another. As a second example, layer 16b has a first electrical conductor in a dual comb like form, and a second electrical conductor that meanders between. As a third example layer 16c has a first and second electrical conductor that are arranged in parallel along a spiral. In an illustrative alternative embodiment the layer may have a larger plurality of electrical conductors. E.g. one pair of electrical conductors for each separate point to be identified in the plane of the panel, the layer 16 may have a pair of electrical conductors. For example each pair of electrical conductors may identify a button for a particular selection. For use as a pointing device, a common pair of electrical conductors, or a single electrical conductor for the entire layer 16 is however preferred, in order to keep the number of connections to the layer low. It is not necessary that a plurality of electrical conductors is used. Alternatively the touch sensitive layer may comprise a single resistive line that meanders in layer 16d, as shown in FIG. 3B.

In again another embodiment, shown in FIG. 3C, a homogeneous electrically conductive touch sensitive layer 16 is applied. The top part of FIG. 3C shows this embodiment in front view (top part of FIG. 3C) and the bottom part of FIG. 3C shows this in cross section according to A-A'. The touch panel shown therein includes electrically conducting electrodes b1, b2, b3, and b4 at each corner of a (transparent) substrate 14, coated with a transparent electrically conductive structure in layer 16, to form an equipotential surface. A voltage is applied to the transparent, electrically conductive structure 16 through the electrically conducting electrodes b1, b2, b3, and b4 for forming an equipotential surface thereon. When a finger touches the touch panel (i.e., the topside of 14) it draws a minute amount of current to the point of contact, creating a voltage drop. The current flow from each corner is proportional to the distance to the touch point. The X/Y location of the point of contact is calculated by the controller and transmitted to the user interface device.

The capacitive touch panel is also capable of detecting changes in an electrical field when a pointing device approaches the panel without directly touching the panel. In this way a detection in the direction normal to the panel is possible, enabling additional input information.

Several options are possible for applying the pattern formed by the one or more electrical conductors in the layer 16.

Preferably the layer 16 with electrically conductive structure is formed using a solution processable, electrically conductive polymer film, as the substrate 20 may degrade upon application of too high temperature or low pressure as needed in conventional sputter deposition of for example Indium Tin Oxide. Such a film can be structured via well-known process steps into the desired structures needed for making a resistive touch panel work. For example, in the case of using photochemical patterning of a highly doped polyaniline (PANI) layer, one can pattern via deep-UV exposure through a mask, creating electrically conducting (<1k.OMEGA./)) and electrically non-conducting regions (>10.sup.10k.OMEGA./) as is described in more detail in G. H. Gelinck et al., Appl. Phys. Lett. 77, 1487-1489 (2000) which is expressly incorporated herein by reference for its relevant teachings. If needed, an additional layer (not shown) can be placed between the electrophoretic foil 20 and the transparent electrical structure in layer 16, for example to act as barrier layer or as adhesion layer (See FIG. 2B), or another function. Other transparent, electrically conducting layer materials for the layer 16 may be used instead of polyaniline, for example polythiophene, polypyrrole or doped polymers. Apart from organic materials, various inorganic transparent, electrically conducting materials like ITO (Indium Tin Oxide), IZO (Indium Zinc Oxide), ATO (Antimony Tin Oxide), or Tin Oxide can be used. Other metal oxides can work, including but not limited to Nickel-Tungsten-Oxide, Indium doped Zinc Oxide, Magnesium-Indium-Oxide. Furthermore other transparent metal containing compounds can be considered as electrically conducting layer. The inorganic materials may be sputtered, evaporated, electrochemically applied, chemical vapor deposited or applied as nanoparticles using well known solution coating techniques like spin coating, spray coating, slit-coating, or printing. Preferably these nano-particles are in the form of nano-tubes, as a relatively low concentration thereof already results in a good electrical conductivity. The absorption of light by the particles in the layer 16 therewith is relatively low.

It may be advantageous to apply the electrically conductive structure in the layer 16 in a separate process and to subsequently apply the layer 16 to the display layer. In general the film 14 is less sensitive than the display structure to some processing conditions like lower pressure, higher temperatures or UV light as needed in some deposition steps.

A transparent protection film 14 or polymer structure e.g. a PET or PEN layer, is applied on top of the touch sensitive layer 16, preferably using an adhesive layer 13. In a favorable embodiment the adhesive layer is a polyurethane layer. This material can be cured at a relatively low temperature (less than 70.degree. C.). Nevertheless other adhesives may be applied, e.g. UV curable adhesives. The thickness of the transparent protection film 14 is preferably less than 150 µm, more preferably 25 to 50 µm, most preferably in the range of 12.5 to 25 µm. Optionally, the top substrate 14 can be provided with an additional optically functional, mechanically protective or chemical protective coating (15), like: anti-reflection, anti-glare, hard-coat, anti-smudge, UV-protection, protection against chemicals, anti-vapor etc. Application of such layers is well known as such. In general the additional layer 15 will have a thickness that is substantially less than that of the film 14.

In a preferred embodiment, shown in FIG. 2B, the touch sensitive structure 22 is coupled by an adhesive layer 13 to the display layer 20. Parts corresponding to those in FIG. 2A have the same reference numerals.

Electrically conducting busbars and tracks on 20 and 14 can be made by various conventional methods like printing, lithography, lift-off, deposition via a shadow mask, etc.

Figure 4A:
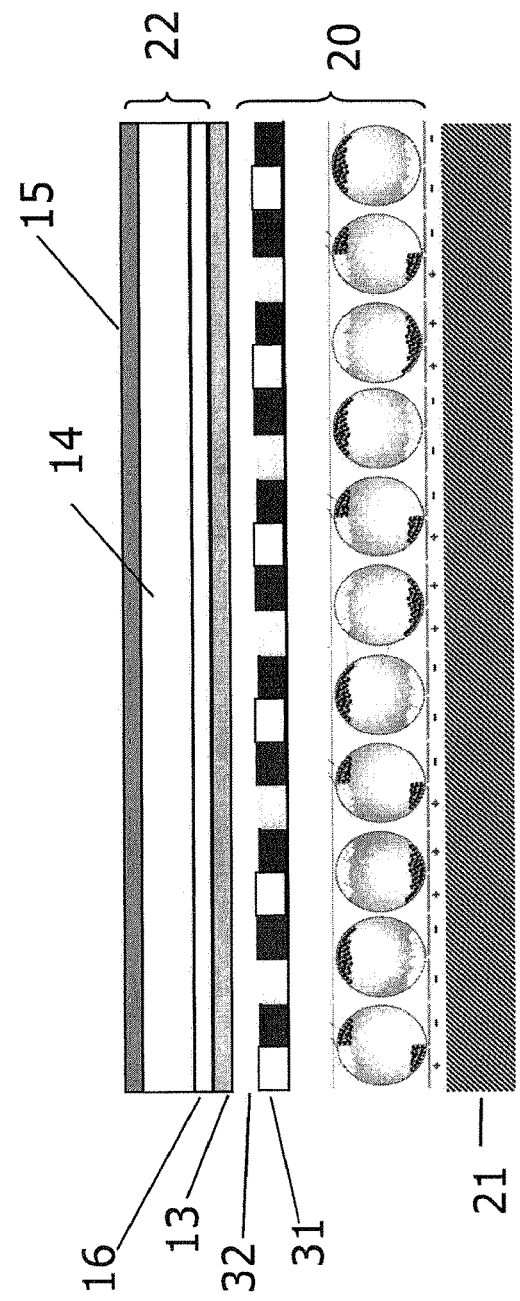
Figure 4B:
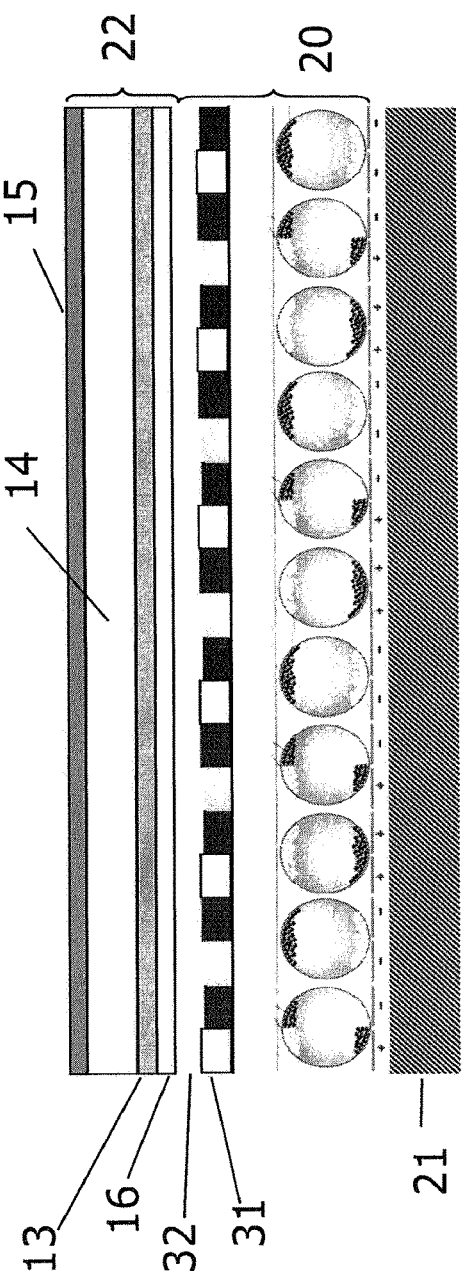

FIGS. 4A and 4B show further embodiments of the invention. Parts therein corresponding to those in FIGS. 2A and 2B have the same reference numeral.

In these further embodiments a color filter 31 is applied on top of the display layer 20. If needed a planarization or protection layer, e.g. a negative resist polymer film or a UV- or thermally cured acrylate film 32 for the color filter layer can be applied onto the color filter 31 before further processing. Such a layer prevents a chemical interaction of the display structure with layers from the touch sensitive structure. The layer 16 with the electrically conductive structure of the touch sensitive structure 22 may be applied with the same materials and with the same processing steps as indicated for FIG. 2A. Alternatively, the location of the adhesive layer 13 and the layer 16 can be exchanged as shown in the embodiment of FIG. 4B. In this case the planarization layer 32 is first provided with the layer 16 with the electrically conductive structure and finally covered by the top substrate 14 via an adhesive 13 or a top substrate 14 with an additional coating 15.

The embodiments of FIGS. 4A and 4B have the additional advantage that the front substrate 14 that cooperates with the layer 16 with the electrically conductive structure to perform a touch sensitive function also serves as a protective layer for the color filter 31.

An electrophoretic display using color filters as such is described in more detail in U.S. Pat. No. 6,850,355.

A further embodiment is shown in FIGS. 5A and 5B. FIG. 5A schematically shows the panel in cross-section while FIG. 5B schematically shows the panel in front view. Parts therein corresponding to those in FIGS. 4A and 4B have the same reference number.

In the embodiment shown therein the substrate 21 has an extending portion 21a that extends in at least one direction beyond the display layer 20 and which is provided with electrically conducting elements 24a, 24b that couple portions 16x, 16y of the electrical conductor 16p in the layer 16 to respective contacts 25a, 25b at an edge 21x of the extended portion 21a. For clarity the display layer 20 is shown as a single layer. Nevertheless the display layer may be composed of a multiplicity of sub-layers as shown in more detail with reference to FIGS. 2A, 2B and 4A, 4B.

Figure 6:
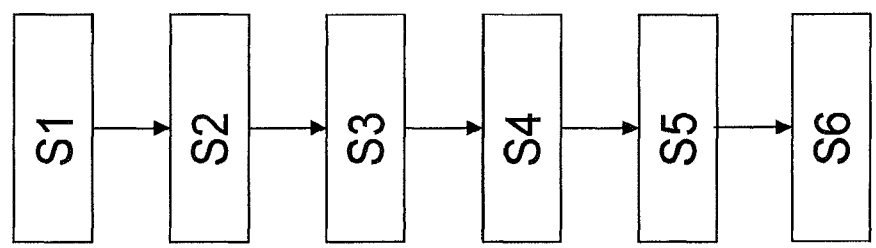
FIG. 6 shows a method of manufacturing a flexible panel, FIGS. 7A to 7C respectively show a display structure on a substrate, a touch sensitive structure and a display panel in another illustrative embodiment of the electronic device of the invention, FIG. 8, schematically shows an embodiment of an electronic circuit in a particular exemplary embodiment of the invention, FIG. 8A schematically shows an embodiment of an electronic circuit in another particular exemplary embodiment of the invention.
Figure 10:
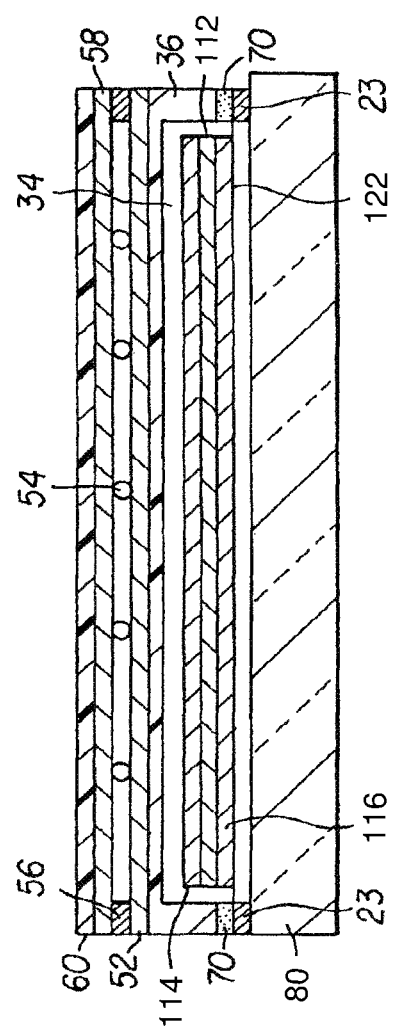
FIG. 10 shows a prior art display panel.

A panel according to this embodiment can be very efficiently manufactured. Preferably such method as illustrated in FIG. 6 comprises the following steps.

In step S1 a first substrate 21 having said electrical conducting elements 24a, 24b is provided.

In step S2 a display layer 20 is applied on said first substrate 21.

In step S3 a second substrate 14 is provided.

In step S4 a pattern of electrically conductive material 16p is applied on said second substrate 14 comprising at least one electrical conductor.

In step S5 the first substrate 21 is adhered to the second substrate 14 with the display layer 20 facing the pattern of electrically conductive material 16p. Preferably, at least a portion of the electrical conductor 16p is free of adhesive to enable a resistive contact with the electrically conducting elements 24a, 24b in the substrate 21. Nevertheless, it is conceivable that the electrical conductor 16p and the electrically conducting elements 24a, 24b are capacitively connected with an electrically non-conductive adhesive as a dielectric.

In step S6 the extending portion of the substrate 21a (FIGS. 5A, 5B) is provided with address decoding elements 28a, 28b for addressing the display layer. The address decoding elements comprise a row decoder 28a and a column decoder 28b.

The steps S1-S6 need not necessarily be executed in the order presented above. Alternatively steps S3 and S4 may be executed before steps S1 and S2, or steps S3, S4 may be applied concurrently with steps S1 and S2.

In the embodiment of FIGS. 5A and 5B the touch sensitive structure has a first layer 16 with a electrically conductive structure 16p in the form of a meandering electrically conductor (as shown in FIG. 3B) that faces the first substrate 21. A first and a second portion 16x, 16y of the electrically conductive pattern 16p is arranged opposite and electrically coupled to a portion of a respective electrically conducting element 24a, 24b of the extended portion 21a of the first substrate 21. This has the advantage that the electrical connection of the layer 16 with the electrically conductive structure 16p of the touch sensitive structure 22 to the data processing facility 8 can be made very easily.

The portions 16x, 16y of the electrically conductive pattern 16p and the portions of their respective electrical conductive element are coupled by an electrically conductive adhesive. Electrically conductive adhesives are well known, for example of the type pressure sensitive adhesive (PSA). Particularly useful as a pressure sensitive adhesive is electrically conductive tape from 3M, type 9703. This is a pressure sensitive adhesive transfer tape with anisotropic electrical conductivity. It is a filled acrylic tape that can be applied at temperatures between room temperature and 70.degree. C. The adhesion builds up within 24 hrs. Another material that can be used is Norland Conductive Adhesive NCA130, which is a silver filled isotropic electrically conductive adhesive that can be cured with UV light and contains latent heat catalyst to cure regions that are not exposed to UV light. Various alternative electrically conductive adhesives can be chosen.

In the embodiment of the electronic device shown in FIG. 5A, 5B the extending portion of the substrate 21a is provided with address decoding elements 28a, 28b for addressing the display layer. The address decoding elements comprise a row decoder 28a and a column decoder 28b. This has the advantage that the number of contacts 25c, 25d at the edge 21x used for addressing the display layer is modest. Accordingly these contacts can be relatively large, which enables a simple and fast assembly to other components.

FIG. 5C shows a top-view of the substrate 21 with the display structure 20. FIG. 5D shows in top view the touch sensitive structure 22 with the layer 16 with the electrically conductive structure. FIG. 5E shows the substrate 21, the display structure 20 and the touch sensitive structure 22 integrated into a flexible display panel 3.

FIGS. 7A to 7C show how another touch sensitive structure 22 (FIG. 7B), as described earlier with reference to FIG. 3C, is integrated with a display structure 20 on a substrate 21 (FIG. 7A) into a display panel 3 (FIG. 7C). In this embodiment the touch sensitive structure 22 has a layer 16 with a touch sensitive structure as shown in FIG. 3C. Portions 16q, 16r, 16s, 16t are electrically coupled to respective portions 24q, 24r, 24s, 24t of electrical conductors in an extended portion of the substrate 21, in a way analogous as shown in FIGS. 5A to 5E.

In another embodiment a direct electrical contact of the electrically conductive layer 16 of the touch sensitive structure to the device is obtained via separate electrically conducting lines, without the need of electrically conducting regions on the display structure, for example by using electrically conducting wires or using a separate flex foil.

It should be noted that the fixed electrode 20d of the display structure may also be used as the electrically conductive layer 16 of the touch sensitive structure. In this case, referring to FIG. 2A, layer 20e is left out and layers 16 and 20d are replaced by a single electrically conductive layer 18. In that case the electrode 18 has a double function, on one side to act as driving electrode for the display effect in the display structure 20, on the other side to act as electrode for the capacitive touch sensitive structure 22. It is not necessary that the electrode 18 is a homogeneous layer. Alternatively the electrode 18 may be applied in a patterned form, e.g. as shown in FIGS. 3A-3C, provided that the detail in the pattern is substantially smaller than the size of the display elements 20a or that the pattern is well-aligned with said display elements.

FIG. 8 schematically shows an embodiment of an electronic circuit to be coupled to the common electrode 18. The electronic circuit 100 comprises the data processing facility 110 controlled by suitable application software for example. The data processing facility 110 controls display driver 120 for driving the common electrode 18. The data processing facility 110 is further coupled to a touch screen driver 130 for driving the common electrode 18 and reading output signals from the electrode 18. A switching element 140 alternatingly couples the display driver 120 and the touch screen driver 130 to the common electrode 18. The switch is preferably alternated in a frequency range of 1 Hz to 100 Hz. At a lower frequency than 1 Hz, it could become visible to the user that the displayed information is updated discontinuously. At a frequency higher than 100 Hz, an interference may occur in the processing of the touch position, because the frequency with which the switching element 140 is alternated is too close to the frequency with which the touch screen driver 130 drives the common electrode 18. When using a multi-stable display effect, such as the electrophoretic E Ink material, switching off the display driving system will not influence the image on the screen. The image will be retained because of multi-stability. The signals appearing on the common electrode when in touch-sensing-mode will also not influence the image on the screen because voltages can be rather small and frequencies will be beyond the response bandwidth of the electrophoretic display material, typically at least a factor 10 higher.

In another embodiment, shown in FIG. 8A, the switching element 140 is replaced by a superposition element 145 that superposes the driving signals from the display driver 120 and the touch screen driver 130 into a superposed signal for driving the common electrode 18.

The display driver 120 for example provides for example a constant voltage, and the touch screen driver 130 provides a high frequency signal. At feedback lines connected to electrodes, e.g. 16q, 16r, 16s and 16t as shown in FIG. 7, output signals are measured indicative for a location of a pointing object near the screen. There will be no interference visible of the touch screen driving signals on the displayed images, provided that the high frequency signal has a frequency substantially higher than the response frequency of the display elements or in a range beyond the sensitivity frequency range of the human visual system.

FIG. 9 shows various practical embodiments of the present invention. The electronic device 1A has a facility in the form of a carrier 9A with joints 9B for wrapping the display 3 around the main housing 9 of the electronic device.

The electronic device 1B has a first housing 9D for compactly storing the display panel 3 in a roll and a second housing 9E for comprising the data processing facility.

The display 3 in its compact shape still has a visible portion 3A. It is possible to add a mechanical protection unit 9F to protect the visible portion 3A. Preferably the protection unit 9F is transparent.

Likewise, the electronic device 1C has a first housing 9D for compactly storing the display panel 3 in a roll and a second housing 9E comprising the data processing facility. In this embodiment the display panel is completely encapsulated by the first housing 9A its compact state.

It is not necessary that the touch sensitive structure covers the entire display structure. For example the touch sensitive structure may be used to simulate selection buttons at an edge of the panel. In that embodiment the touch sensitive structure only needs to cover a minority portion of the display structure. The panel may be provided with an additional support structure to support said minority portion of the display structure.

In the claims the word "comprising" does not exclude other elements or steps, and the indefinite article "a" or "an" does not exclude a plurality. A single component or other unit may fulfill the functions of several items recited in the claims. The mere fact that certain measures are recited in mutually different claims does not indicate that a combina-

What is claimed is:

1. An electronic device comprising:
   a data processing facility; and
   a flexible panel, and a facility for arranging the flexible panel at least into an extended shape and into a compact shape, the flexible panel including:
      a display structure responsive to output signals from the data processing facility, and
      a touch sensitive structure arranged for providing input signals to the data processing facility indicative of a change of capacitance at a position where a pointing device approaches the panel, the touch sensitive structure comprising:
         an electrically conductive structure layer arranged over the display structure,
         a substrate on which the display structure is arranged, the substrate comprising an extending portion that extends from only one side of the display structure, and
         a plurality of contacts disposed at an edge of the extending portion of the substrate,
   wherein the extending portion of the substrate includes a plurality of electrically conducting elements respectively extending across the extending portion of the substrate to the display structure and up to the touch sensitive structure to respectively physically connect and electrically couple one of the plurality of contacts to a respective one of a plurality of contact portions of the electrically conductive structure layer,
   wherein the plurality of contact portions of the electrically conductive structure layer are disposed along only opposite edges of the one side of the display structure, and
   wherein the opposite edges of the one side of the display structure are disposed on opposite sides of a plurality of address decoding elements.

2. The electronic device according to claim 1, wherein the flexible panel in the compacted shape has at least a portion that is curved to a radius of at most 20 mm.

3. The electronic device according to claim 1, wherein the display structure is reflection based.

4. The electronic device according to claim 1, wherein the display structure applies a multi-stable based display effect.

5. The electronic device according to claim 1, wherein the display structure comprises a layer of electrophoretic elements.

6. The electronic device according to claim 1, wherein the display structure comprises a layer of LEDs.

7. The electronic device according to claim 1, wherein the display structure comprises a color filter layer.

8. The electronic device according to claim 1, wherein the touch sensitive structure further comprises a electrically isolating layer, the electrically conductive structure layer being arranged between the electrically isolating layer and the display structure.

9. The electronic device according to claim 8, wherein the electrically conductive structure layer comprises at least a first electrical conductor and a second electrical conductor, the first electrical conductor and the second electrical conductor being mutually capacitively coupled.

10. The electronic device according to claim 9, wherein the first electrical conductor and the second electrical conductor are mutually interlaced.

11. The electronic device according to claim 10, wherein the first electrical conductor and the second electrical conductor are part of a larger plurality of electrical conductors.

12. The electronic device according to claim 9, wherein the first and second electrical conductors are formed out of a transparent, electrically conductive material.

13. The electronic device according to claim 12, wherein the transparent, electrically conductive material comprises electrically conducting nanotubes.

14. The electronic device according to claim 8, wherein the touch sensitive structure is coupled by an adhesive layer to the display structure.

15. The electronic device according to claim 1, wherein the touch sensitive structure is covered with an optically functional, mechanically protective or chemical protective coating.

16. The electronic device according to claim 1,
   wherein the plurality of contact portions of the electrically conductive structure layer comprises a first and a second contact portion, and
   wherein the first and a second contact portion is arranged opposite and electrically coupled to a portion of a respective electrically conducting element of the extended portion of the substrate.

17. The electronic device according to claim 16, wherein the plurality of contact portions of the electrically conductive structure layer and the portion of a respective electrically conductive element are coupled by an electrically conductive adhesive.

18. The electronic device according to claim 1, wherein the extending portion of the substrate is provided with address decoding elements for addressing the display structure.

19. The electronic device according to claim 1, wherein the touch sensitive structure only covers a portion of the display structure.

20. The electronic device according to claim 19, wherein the panel includes a support structure to support said portion of the display structure.

21. The electronic device according to claim 8,
   wherein the display structure comprises a layer of display elements that are controlled by individual electrodes and a fixed electrode, and
   wherein the fixed electrode additionally serves as a first layer of the touch sensitive structure.

22. The electronic device according to claim 21, wherein a common electrode is alternately coupled to a display driver and a touch screen driver via a switching element.

23. The electronic device according to claim 21, wherein a common electrode is simultaneously coupled to a display driver and a touch screen driver via a superposition element.

* * * * *